United States Patent [19]

Katayama et al.

[11] Patent Number: 4,720,243
[45] Date of Patent: Jan. 19, 1988

[54] IMPELLER OF CENTRIFUGAL FLUID-TYPE ROTARY MACHINE

[75] Inventors: Kazuzo Katayama; Susumu Izaki; Ken Fujita, all of Hiroshima, Japan

[73] Assignee: Mitsubishi Jukogyo Kabushiki Kaisha, Japan

[21] Appl. No.: 909,639

[22] Filed: Sep. 22, 1986

Related U.S. Application Data

[62] Division of Ser. No. 839,360, Mar. 13, 1986.

[51] Int. Cl.$^4$ .............................................. F04D 29/22
[52] U.S. Cl. .................................. 416/188; 416/186 R
[58] Field of Search ............... 416/183, 185, 188, 242, 416/186 R, DIG. 2

[56] References Cited

U.S. PATENT DOCUMENTS

| | | | |
|---|---|---|---|
| 1,959,703 | 5/1934 | Birmann | 416/183 |
| 2,407,469 | 9/1946 | Birmann | 416/188 X |
| 2,465,671 | 3/1949 | Van Millingen et al. | 416/188 |
| 2,480,807 | 8/1949 | De Vlieg | 416/188 |
| 2,782,691 | 2/1957 | Feagans | 416/188 X |
| 2,962,941 | 12/1960 | Stein et al. | 416/183 X |
| 2,985,952 | 5/1961 | Nutter et al. | 416/188 X |
| 4,594,052 | 6/1986 | Niskanen | 416/185 |

FOREIGN PATENT DOCUMENTS

| | | | |
|---|---|---|---|
| 594537 | 11/1947 | United Kingdom | 416/183 |
| 594538 | 11/1947 | United Kingdom | 416/183 |

*Primary Examiner*—Everette A. Powell, Jr.
*Attorney, Agent, or Firm*—McGlew and Tuttle

[57] ABSTRACT

An impeller of a centrifugal fluid-type rotary machine includes impeller blades each having a concave and convex surface of which the shape is formed of parallel generatrices inclined with respect to a rotary shaft by an angle defined for each impeller blade. A method of manufacturing the impeller includes inclining a main plate material of the impeller with respect to a plane of a table of a machine tool by a desired angle, fixedly mounting the plate on the table after placing the plate on a rotation indexable jig, controlling three axial positions of the plate in the right and left, front and rear and upper and lower direction by a three-axis controller and cutting out the main plate or side plate by a cutting tool to integrally form the impeller blades on the plate.

1 Claim, 15 Drawing Figures

FIG. 6a (PRIOR ART)
FIG. 6b (PRIOR ART)
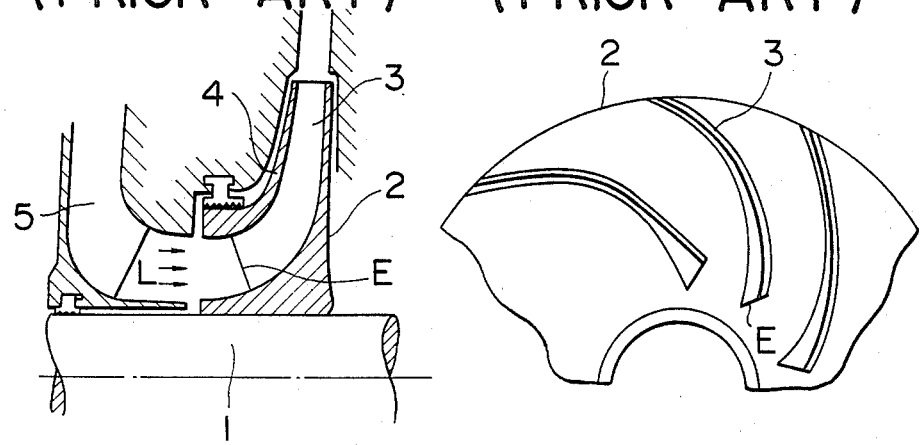
FIG. 7a (PRIOR ART)
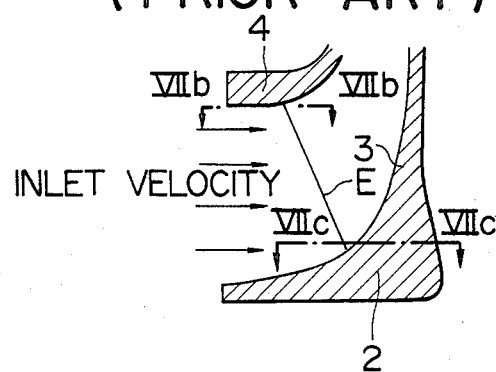
FIG. 7b (PRIOR ART)
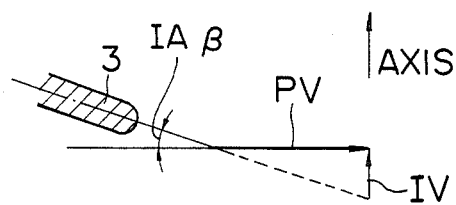
FIG. 7c (PRIOR ART)
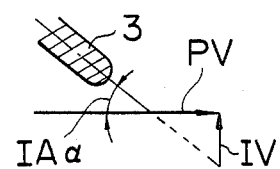

IMPELLER OF CENTRIFUGAL FLUID-TYPE ROTARY MACHINE

This is a division of application Ser. No. 839,360 filed Mar. 13, 1986.

FIELD OF THE INVENTION

The present invention relates to an impeller of a lubricating oil pump for a steam turbine for use in a turbo generator and an impeller of a centrifugal fluid-type rotary machine such as a high-pressure pump, a centrifugal compressor and a centrifugal blower and a manufacturing method thereof.

PRIOR ART

A prior art impeller and manufacturing method thereof will now be described with reference to FIGS. 5 to 9.

FIG. 5a shows a section of an impeller used in a fluid machine such as a pump and a centrifugal compressor including a centrifugal impeller using conventional technique and FIG. 5b shows a section taken along line Vb—Vb of FIG. 5a. Numeral 1 denotes a rotary shaft, 2 a main plate of an impeller attached on the rotary shaft 1, 3 impeller blades, 4 a side plate, and 5 straightening vanes for introducing fluid into the impeller efficiently.

The prior art impeller rotated at a high speed is manufactured by cutting out the main plate 2 to form the impeller blades integrally thereon and joining the impeller blades 3 with the side plate 4 by rivets or welding. Alternatively, the impller is manufactured by cutting out the side plate 4 to form the impeller blades 3 integrally thereon and joining the impeller blades 3 with the main plate 2.

The conventional impeller includes the impeller blades all of which are formed in the same shape at any section perpendicular to the shaft as shown in FIGS. 5a and 5b. More particularly, the shape of the concave surface and the convex surface of the impeller blades is formed of the generatrix parallel to the shaft of the impeller. The generatrix is a straight line component involved in a curved surface such as a conical surface, a cylindrical surface and the like. Since the impeller blades have such shape, an end mill cuttter EM attached to a movable spindle S which is controlled to be moved in the Z-axis direction, that is, in the axial direction of the impeller perpendicular to the X-Y plaen, as shown in FIG. 9, is used to cut out the main plate 2 so that the impeller blades are integrally formed on the main plate 2.

PROBLEMS THAT THE INVENTION IS TO SOLVE

In recent years, various improvements in design have been performed to increase efficiency of the fluid machines. Particularly, improvement in the shape of impeller increases efficiency. One of improvements in design is that an inner top end E of the impeller blades 3 from which fluid is sucked in the impeller blade side is extended to the inner diameter of the shaft as compared with that of the conventional impeller blades (refer to FIGS. 6a and 6b). This aims at reduction of loss due to collision of the inner top end of the blades and fluid by slowing down the peripheral velocity of fluid at the inner top end E of the blades 3 and reducing the relative inlet velocity IV of fluid with respect to the blades when fluid L, flowing in the substantially axial direction, is introduced to the rotating impeller.

In this case, since radii of the end E of the blades at the side of main plate 2 and at the side of side plate 4 are different, the peripheral velocities PV at the side of main plate 2 and at the side of side plate 4 are different. Accordingly, relative inlet angles IA of fluid at the side of main plate 2 and at the side of side plate 4 are greatly different as shown in FIGS. 7a, 7b and 7c. The surfaces of the blade near the leadig edge of the suction side is more deflected from the rotary shaft at the side of the side plate 4, then it is at the side of the main plate 2. In order to suck fluid efficiently with respect to the relative inlet angles IA which are different at the side of main plate 2 and at the side of side plate 4 in this manner, it is necessary to form the impeller blades 3 to have different sections in the axial direction, that is, three-dimensional impeller blades as illustrated by the sectional shape of impeller blades in the axial direction in FIG. 8 in which the side plate 4 is removed. Thus, it is necessary to work the main plate 2 or the side plate 4 so that the impeller blades 3, each having such a complicated shape, are provided at equal intervals in the circumferential direction of the impeller.

Generally, it is impossible to form such an impeller including torsion by using only the working machine having a three-axis controller shown in FIG. 9. A working machine having a so-called five-axis controller is required which can control rotational angles around two axes perpendicular to each other in a plane perpendicular to a rotary shaft of a cutter spindle to rotate the cutter spindle. The working machine having such a complicated controller is very expensive. Accordingly, the cost of products is increased and cheap and efficient products can not be supplied.

It is an object of the present invention to provide an impeller including impeller blades, particularly three-dimensional impeller blades having a shape which can be manufactured by using a working machine with a three-axis controller and a method of manufacturing it.

MEANS OF SOLVING THE PROBLEMS

A first problem is solved by an impeller of a centrifugal fluid-type rotary machine according to the present invention including impeller blades each having a concave and convex surface being formed of parallel generatrices inclined with respect to a rotary shaft by an angle defined for each blade.

A second problem is solved by a manufacturing method of an impeller which comprises mounting fixedly on a table of a three-axis control working machine, a jig which can be rotatably indexed around an axis inclined with respect to a direction of a spindle of the working machine, placing a main plate material of the impeller onto the jig, effecting rotation indexing for each impeller blade, controlling the spindle in three axes to adjust a position thereof and forming integrally impeller blades on the main plate by using a cutting tool.

OPERATION OF THE INVENTION

A plurality of impeller blades to be disposed at equal spacing on a periphery of the impeller are formed for each blade.

The direction of a spindle rotating axis of the three-axis control working machine is Z-axis and a table plate perpendicular to the Z-axis on a plate extending along the X-axiz and Y-axis. Which the rotating shaft of the impeller is Zr-axis, the main plate material of the impeller is fixedly mounted on the table plate by using the jig having a rotation indexable mechanism so taht the Zr-axis is inclined with respect to the Z-axis by an angle α. The main plate material is rotatably indexed around the Zr-axis. Each of the impeller blades is formed by a cutting tool mounted to the spindle. By fixing the X and Y axes of the spindle and moving along the onyly Z-axis, a concave surface and a convex surface of each impeller blade can be formed to a cylindroid formed of generatrices parallel to the Z-axis. Other parts of the impeller blade are formed by controlling the spindle in the three-axis direction of the XYZ triad. When formation of one blade is finished, the rotation indexing mechanism of the jig is used to rotate the main plate material around the Zr-axis by a desired angle and formation of a next blade is begun. The main plate 2 does not rotate when each blade is being cut by the cutting tool rotating with the spindle. After the cutting of each blade, the jig 6, on which the main plate is fixed, is indexed or rotated using a rotation mechanism: where the rotation axis Zr of the jig 6 is inclined at an angle alpha against the spindle axis. The jig rotation axis ZR is identical to the impeller rotation axis Zr.

EMBODIMENT OF THE INVENTION

A method and an impeller manufactured by the method according to the present invention will now be described with reference to the drawings, in which:

FIG. 2b is a persepective view of the impeller seen from the generatrix direction of one impeller blade of the impeller of FIG. 2a;

FIG. 6a is a sectional view of an improved impeller for the impeller of FIG. 5a;

FIG. 6b is a sectional view of the impeller of FIG. 6a;

FIG. 7a is a sectional view of the impeller for illustrating a relative inlet angle of fluid to the impeller of FIG. 6a;

FIG. 7b is a sectional view taken along line VIIb—VIIb of FIG. 7a;

FIG. 7c is a sectional view taken along line VIIc—VIIc of FIG. 7a;

DETAILED DESCRIPTION

Figure 1:
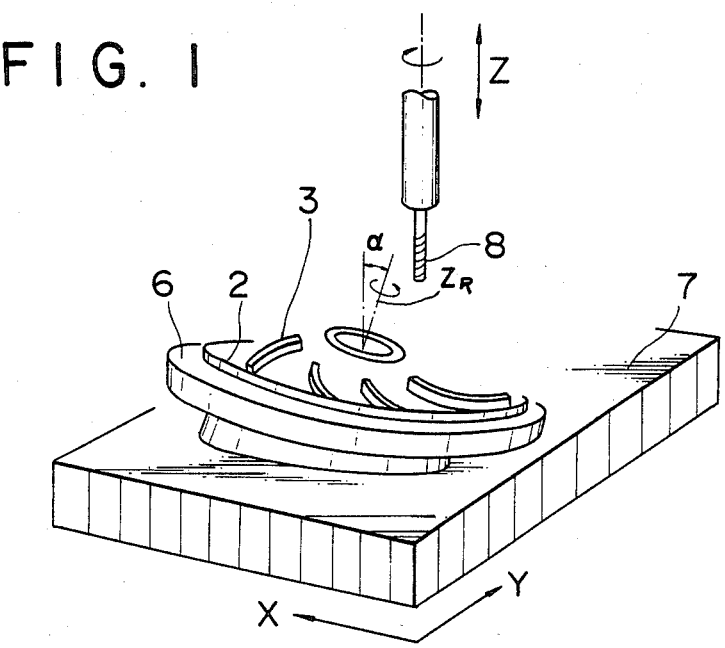
FIG. 1 is a persepective view schematically illustrating the disposition of a three-axis control working machine and an impeller when the impeller is manufactured using the method according to the present invention.
Figure 2A:
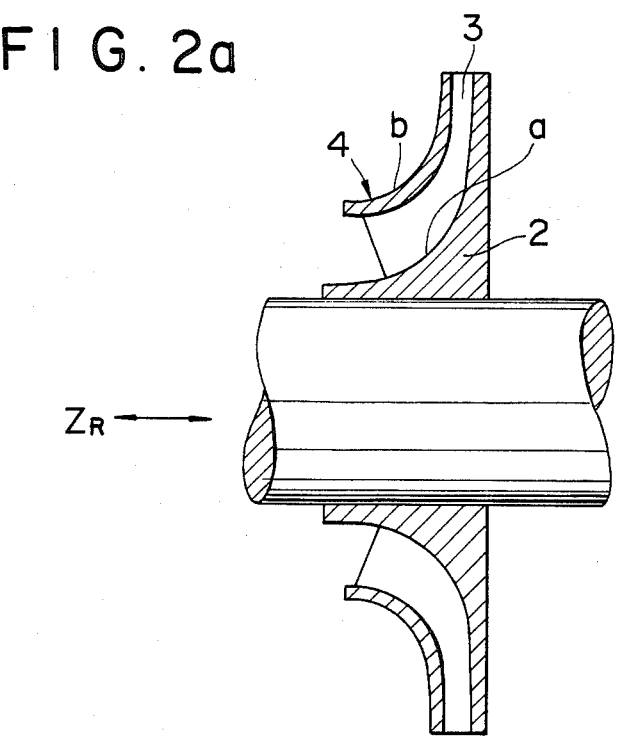
FIG. 2a is a sectional view of the impeller manufactured using the method according to the present invention.
Figure 2B:
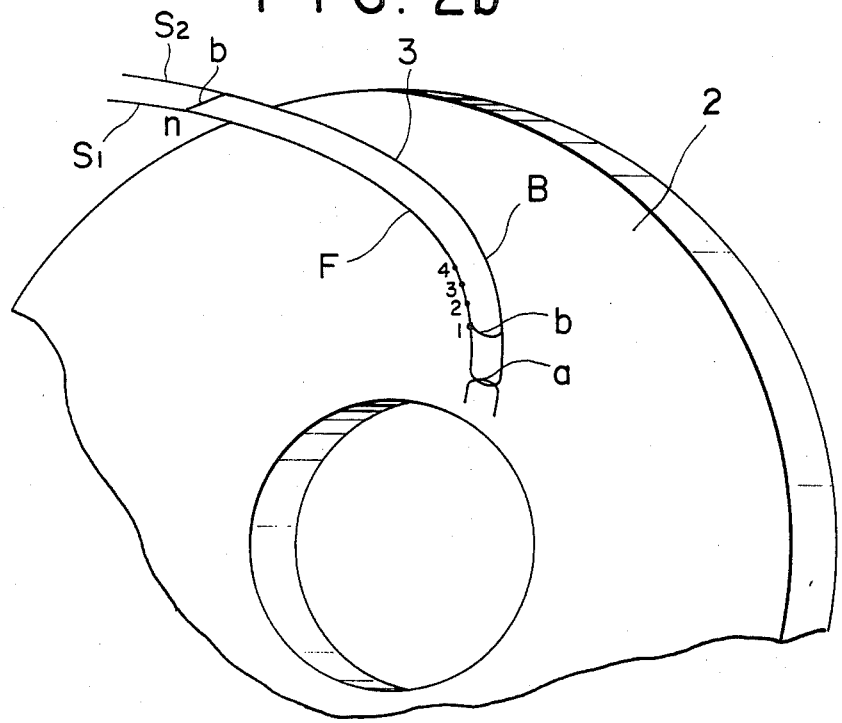

FIG. 2b illustrates an impeller manufactured by the method according to the present invention and seen from a direction inclined by an angle α with respect to the direction of a rotary shaft for a main shaft 2 before a side plate 4 is mounted, in which only one impeller blade is shown and other blades are omitted. The shape of an impeller blade shown by a illustrates a root or base of the main plate and the shape of the blade shown by b illustrates a part corresponding to a root or base of the side plate 4. The shapes a and b of the blade as shown in this manner are overlapped at a certain portion on curves S1 and S2 forming the shape of a back B, that is, a convex surface and a front F, that is, a concave surface and are formed by a part of a common smooth curve. That is, the shapes of the back B and the front F are formed of generatrices perpendicular to the paper on which the drawing is depicted.

Figure 3:
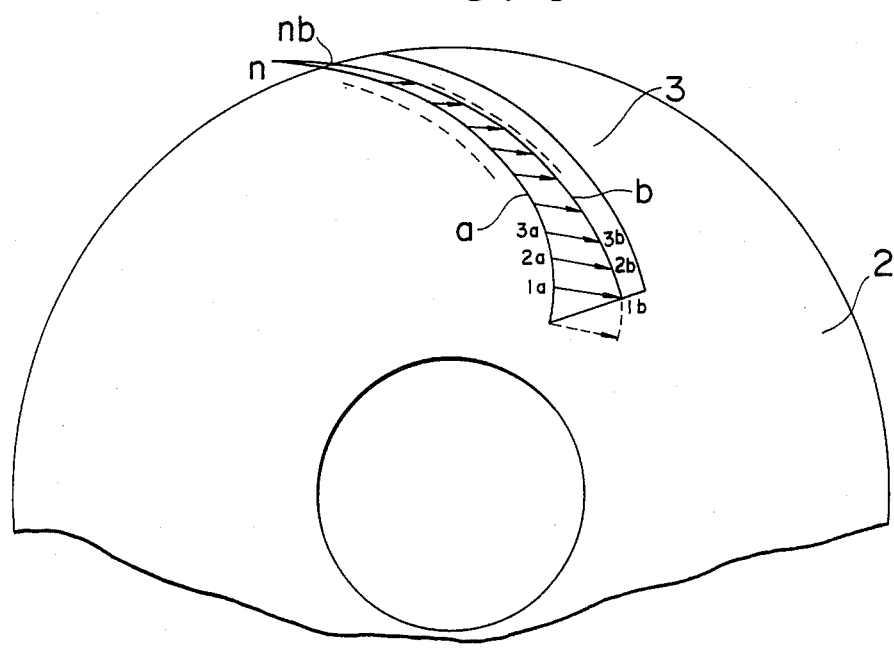
FIG. 3 is a front view of the impeller of FIG. 2a seen from a rotary shaft direction.

Since the generatrices are inclined with respect to the rotary shaft of the impeller by an angle α, the front side of the blade can be seen as shown in FIG. 3 when seen from the direction of the rotary shaft while the back side of the blade can not be seen since the back side hides behind the blade. In this case other blades 3 are omitted. Further, points 1, 2, 3 . . . n on the front surface F of the blade 3 overlapped in FIGS. 2a and 2b are divided into points 1a and 1b, 2a and 2b, 3a and 3b, . . . , na and nb, repectively. The curve shown by points 1a, 2a, 3a . . . na shows the shape of the blade 3 at the root on the main plate and the curve shown by points 1b, 2b, 3b . . . nb shows the shape of the blade 3 at the root on the side plate.

Figure 4:
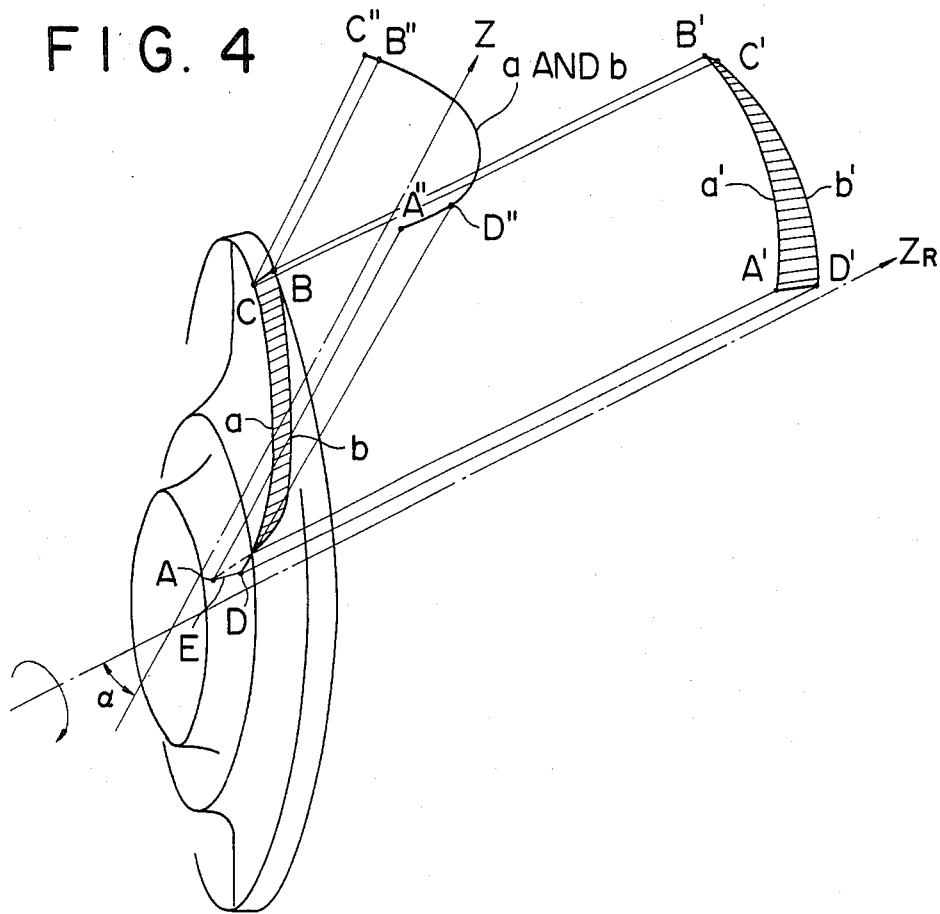
FIG. 4 is a persepective view of the impeller showing the projection of the impeller blade of the impeller of FIG. 2a toward the shaft and the generatrix of the impeller.
Figure 5A:
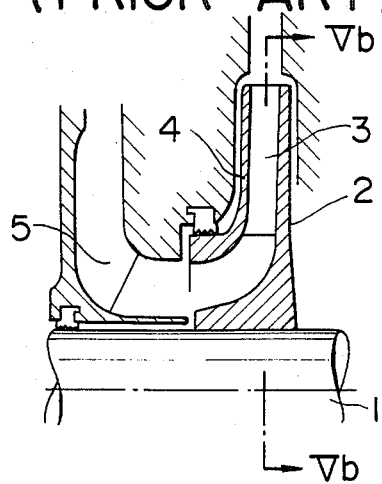
FIG. 5a is a sectional view of a impeller manufactured by a conventional technique.
Figure 5B:
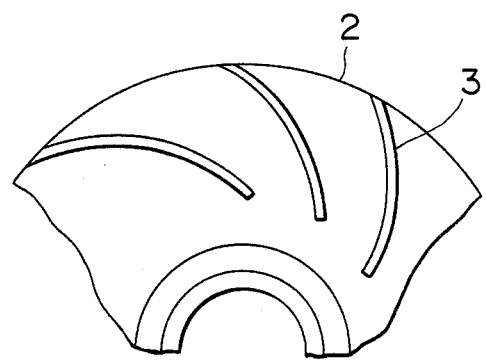
FIG. 5b is a sectional view of the impeller taken along line Vb —Vb.
Figure 8:
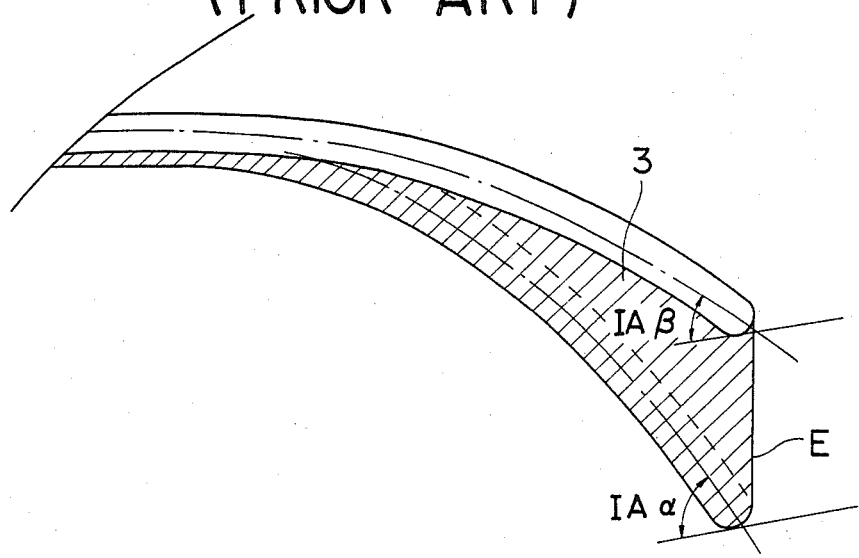
FIG. 8 is a partial enlarged view showing a shape of a blade seen from the shaft direction of the impeller in which a side plate is removed.
Figure 9:
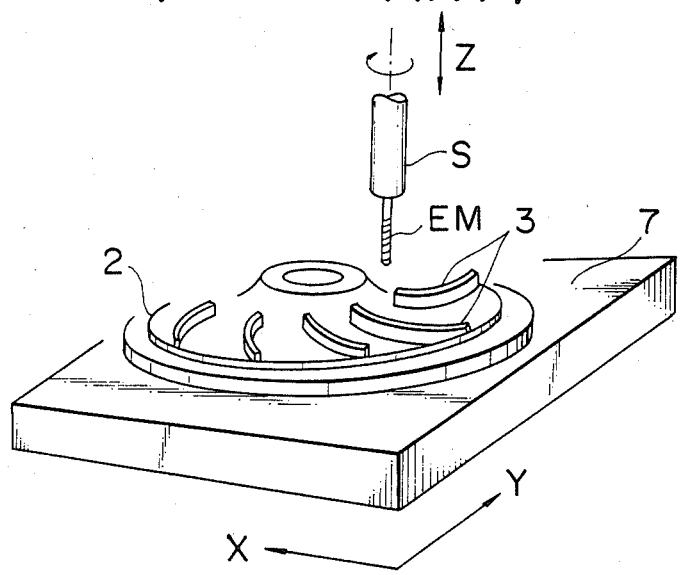
FIG. 9 is a persepective view schematically illustrating the disposition of a working machine and the impeller in a manufacturing method of the impeller by a conventional technique.
Figure 10:
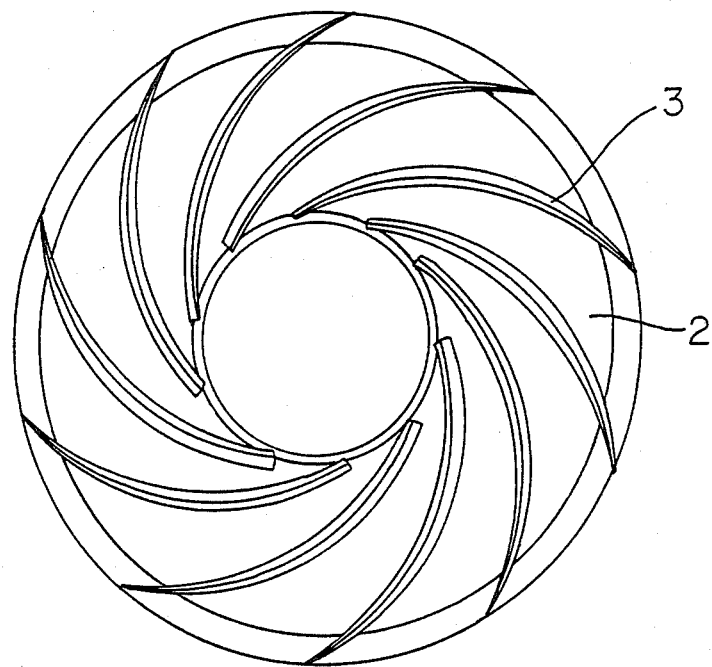
FIG. 10 is a front view of the impeller with the side removed.

The shape of the impeller manufactured by the method of the present invention is now described in detail with reference to FIG. 4. In FIG. 4 the axes Zr and Z form the horizontal plane for example. A', B', C', D', A' is the projection of the plane formed with the axes ZR and Y while A", D", B" and C" is the projection on the plane formed with the axes Z and Y, where Y is the axis perpendicular to the plane formed with ZR and Z.

An intersecting point between the blade 3 and the curved surface of the main plate 2 side at the fluid inlet end E of the impeller blade is A and an intersecting point between the blade 3 and the curved surface of the side plate 4 side is D at the inlet end. A central axis of rotation of the impeller is Zr. For simplicity of explanation, only the front surface side, that is, the concave side of the blade 3 is shown. The description about the back surface is the same as that about the front surface and accordingly the curved surface at the side of front surface is hereinafter referred to as a "curved surface of the blade". In the figure, only one blade is shown for simplicity of the drawing.

A point in which the curved surface of the blade is intersected with the outer peripery of the side surface of the main plate is B and a point in which the curved surface is intersected with the outer periphery of the side plate is C. The curved surface of the blade twisted three-dimensionally in this way is shown by hatched area ABCD in the figure.

When the shape of the blade is projected on a plane perpendicular to the axis in Zr-axis direction, that is, in the axial direction of the impeller, the projected points of the points A, B, C and D are A', B', C' and D', respectively, and the curves a and b in which the curved surface of the blade is intersected with the main plate 2 and the side plate 4 are a' and b', respectively. Thus, the projected curve onto the plane is not coincident.

When the curved surface of the blade is projected on a plane perpendicular to Z-axis, that is, the spindle rotary shaft forming an angle $\alpha$ between Zr-axis and the Z-axis, the points A, B, C and D are projected onto points A", B", C" and D", respectively, and the curves a and b are projected onto a" and b" so that both the curves overlap each other.

The present invention is characterized by the twisted impeller blades constructed by forming the curved surface of the front and back side of the blades by a curved surface which overlaps a curved surface when projected toward the axial direction forming any angle $\alpha$ between the Z-axis and the axial direction.

While the above description has been made for the impeller having the side plate, it will be readily understood that the same method can be utilized for impeller blades which are integrally cut out together with the main plate without the side plate.

EFFECTS OF THE INVENTION

The shape of the impeller blades formed by the above-described working method includes a large inlet angle at the side of the main plate and a small inlet angle at the side of the side plate as shown in FIG. 3. The outlet angle of fluid at the outer peripheral end can be formed to the substantially identical angle for both of the main and side plate. The angle of the impeller blade can be equal to the theoritical inlet angle of fluid at the respective radial positions in the fluid inlet end of the blades by the reason described above and the efficient impeller can be obtained.

An inexpensive impeller with high efficiency can be manufactured using the conventional three-axis control working machine and can be worked in large quantities without great renewal of production facilities.

We claim:

1. An impeller of a centrifugal fluid-type rotary machine comprising a plurality of impeller blades disposed between the main plate and a side plate of said machine symmetrically arranged around said rotary shaft, said blades being formed in a curved shape and having a convex front surface and a concave back surface, said front curved surface and said back curved surface of said blades being formed by parallel geneatrices inclined with respect to said rotary shaft, said blade having edged surfaces with a leading edge at the suction side which is more deflected from said rotary shaft at the outer ends than at their inner ends.

* * * * *